Patented Feb. 22, 1944

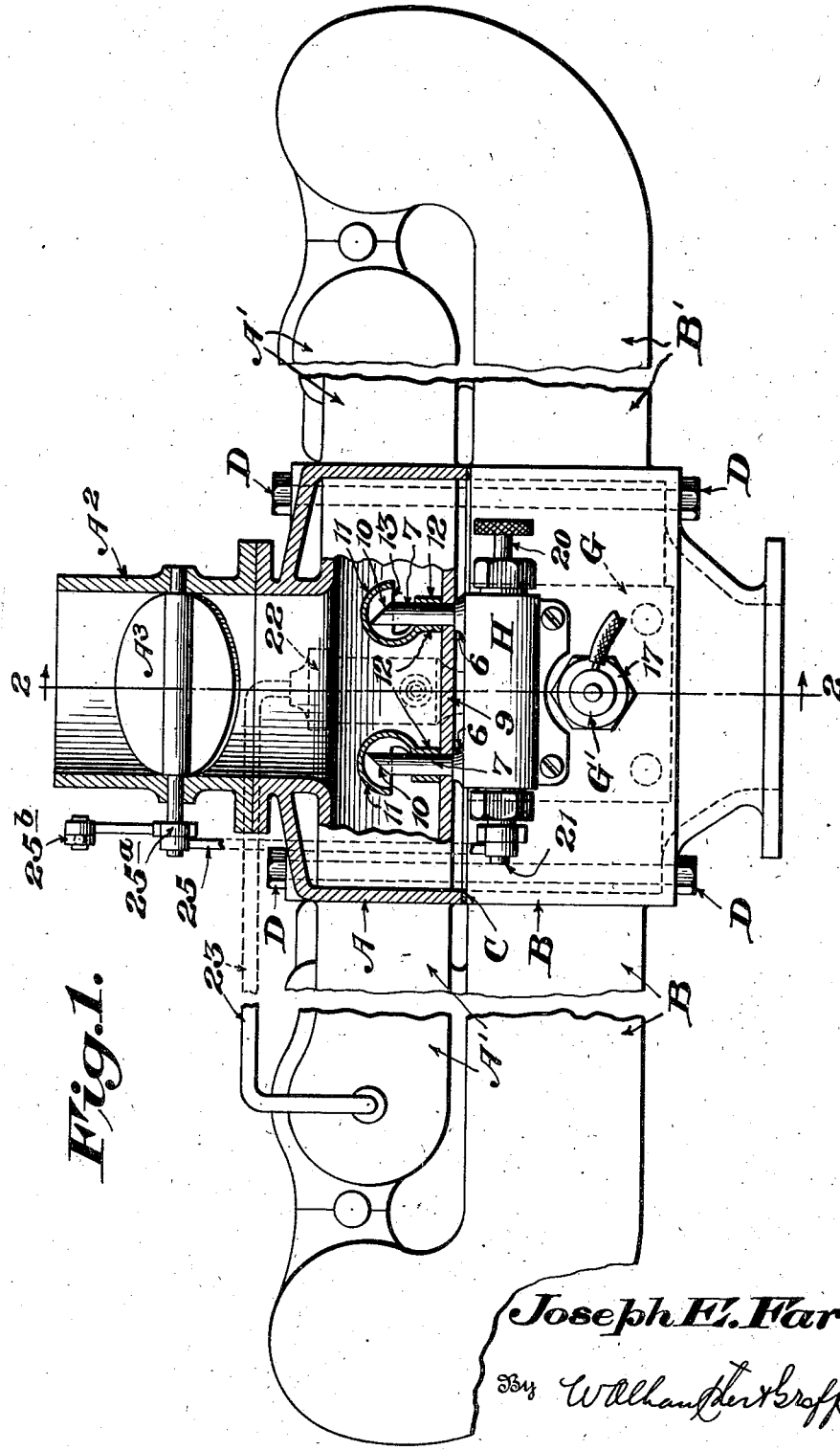

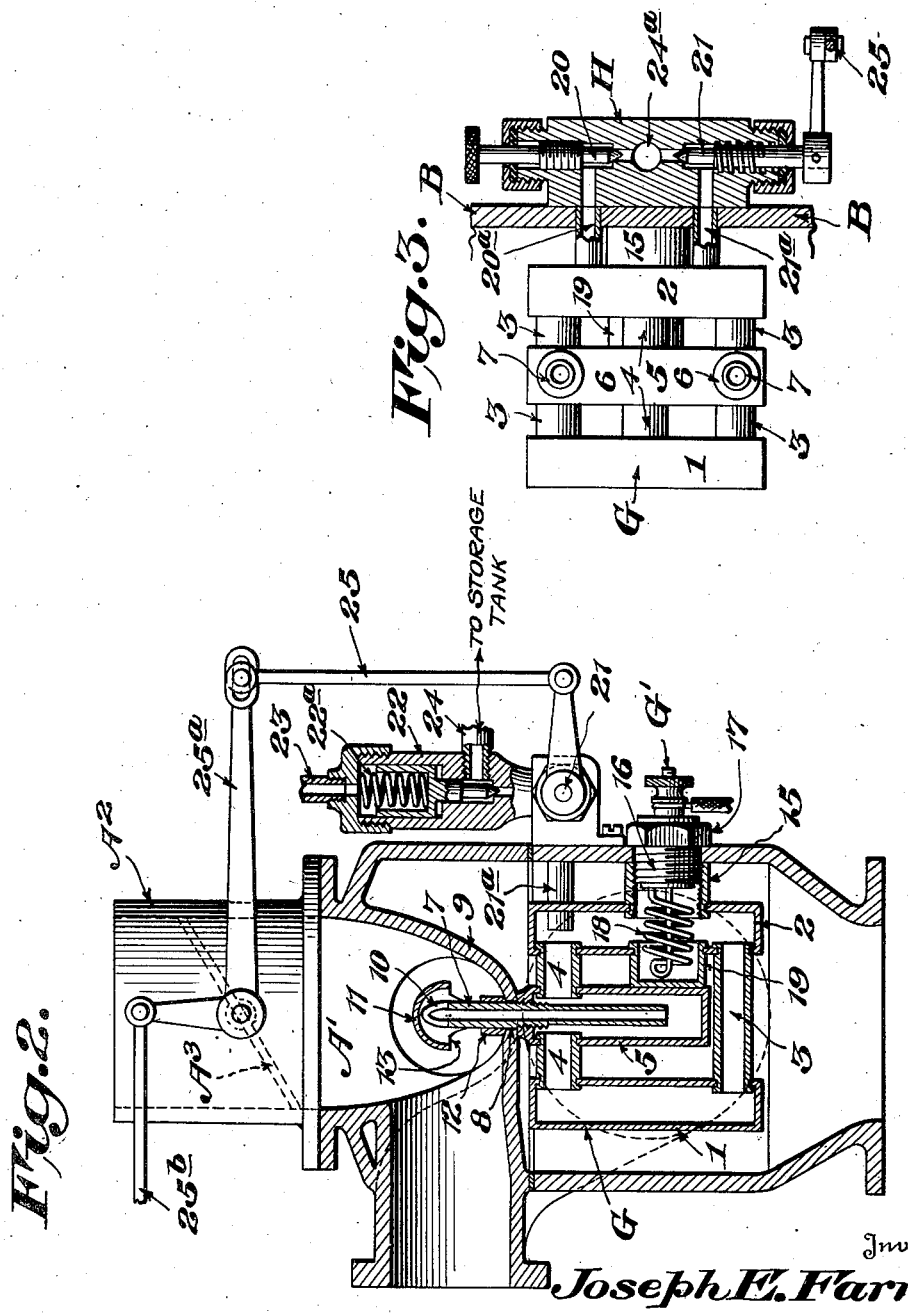

2,342,132

UNITED STATES PATENT OFFICE 2,342,132

FUEL SUPPLY SYSTEM FOR INTERNAL COMBUSTION ENGINES

Joseph E. Farrell, Toms River, N. J., assignor to Gasomiser Corporation, Wilmington, Del., a corporation of Delaware Application January 4, 1943, Serial No. 471,273

6 Claims. (Cl. 123—133)

This invention relates to improved means for supplying internal combustion engines with dry, hot, gaseous fuel as distinguished from wet fuel mixtures formed by spraying a volatile liquid into the air stream of the intake manifold.

A primary object of the invention is to provide gas generating means, that is, means for converting liquid fuel into gas, embodied in or consolidated with the intake and exhaust manifold elements so as to provide a complete unit for application to an automotive engine of a given design, thereby not only simplifying the manufacture and subsequent assembly or installation with respect to the engine, but at the same time, insuring the utilization of the full heat of the exhaust manifold to effect gasification of liquid fuel and also insure delivery of the dry, hot, gas to the air stream of the intake manifold in such a way as to effect proper distribution and increased efficiency.

Another object of the invention is to provide a novel form of gas generator and novel aspirating means for conducting gas from the generator to the intake manifold.

With the above and other objects in view, which will more readily appear as the nature of the invention is better understood, the same consists in the novel construction, combination, and arrangement of parts hereinafter more fully described, illustrated and claimed.

A preferred and practical embodiment of the invention is shown in the accompanying drawings in which:

Fig. 1 is a side elevation, partly in section, of the improved construction.

Fig. 2 is a vertical sectional view taken on the line 2—2 of Fig. 1.

Fig. 3 is a detail view showing the generator in plan and the liquid fuel supplying means and a part of the casing in horizontal section.

Similar reference character designate corresponding parts throughout the several figures of the drawings.

The present construction is primarily concerned with providing a combined intake and exhaust manifold construction having incorporated therein a generator for converting into gas, such otherwise unusable liquids as low grade heating oils, kerosene, alcohol, turpentine, or similar liquids, said gas when mixed with air forming a combustible mixture, which, on compression, forms a charge adapted to be exploded by the spark plugs of the usual ignition system of an internal combustion engine.

Referring to the embodiment shown in the drawings, the invention includes in its organization an intake manifold section having a central housing portion A provided with the intake manifold extensions A', and an exhaust manifold section having a mating housing portion B also provided with exhaust manifold extensions B'. The housing portions A and B are connected and held together at the horizontal gasketed joint C through the medium of suitable bolts D. Thus, it will be understood that the respective manifold sections may each be cast or otherwise formed to include an intermediate housing for the gas generator G and its associated parts.

The upper housing portion A is fitted with a down draft intake collar A2 having therein a throttle valve A3 while the lower housing portion B is formed with an outlet port B2 which may be connected in the conventional manner with an exhaust waste pipe. It will also be understood that the intake manifold extensions A' and the exhaust manifold extensions B' are provided, as shown, with appropriate ported portions for registration with the ports in the cylinder block, which, on one hand, supply the cylinders with the gaseous mixture and on the other hand, permit of the escape of hot exhaust gases.

Referring more specifically to the features of the gas generator G it will be observed that the same is located in the housing portion B formed between the exhaust pipe extensions B', that is, at the junction of the otherwise oppositely disposed extensions B'—B' thereof, so as to be directly in line with the hot exhaust gases before they proceed to enter the exhaust waste pipe. The said generator G preferably consists of a pair of spaced outer hollow casings 1 and 2 which communicate with each other near their bottom corners by a plurality of connecting tubes 3. The upper portions of the casings are connected by a relatively short tubular section 4—4 with an intermediate casing 5 which constitutes a gas collector, or trap, as will presently appear.

The intermediate casing 5 is provided on its top with one or more nipple portions 6 which receive aspirating tubes 7. These tubes have their lower inlet ends projecting into the intermediate casing 5 while their intermediate portions above the nipples 6 pass through the openings 8 in the wall 9 of the intake manifold to permit the upper outlet ends 10 thereof to project into the air stream area of the intake manifold A'. As will be observed from the drawings, said upper ends or tips of the tubes 7, are cut on the bias, that is, at a substantially 45° angle to assist in inducing a vacuum in the tubes 7 when the motor or engine is in operation. The outlet end 10 of each tube 7 is covered with a cap or hood 11 which shields it from the direct force of air coming through the throttle collar A2 and also assists in creating a vacuum about the angularly cut outlet ends 10. Each cap or hood has a tubular shank portion 12 which fits over its related tube 7, and, as shown in Fig. 1, the downwardly opening portions of the hoods provide an aspirating edge 13 which surrounds the outlet end of the tube at a point substantially in the plane of the lowermost edge of the bias-cut opening 10. To effect better distribution of gas in the manifold the caps or hoods 11 are disposed in reversed relation and thus have their aspirating edges 13 so disposed as to direct gas vacuumed from the generator toward opposite ends of the intake manifold A'.

Since, as previously indicated, the assembly is made in two sections, A and B, connected by the horizontal gasketed joint C, it will be apparent that the aspirating tubes 7 of the generator may be readily fitted into appropriate openings 8 in the wall of the manifold A' prior to affixing or positioning the caps or hoods 11. These hoods can be readily attached or put in place through the upper neck of the casing which connects with the throttle collar A2.

The generator G is preferably supported in the housing provided by the lower section B of the assembly through the medium of an internally threaded spacing nipple 15 which cooperates with the threaded shank 16 of the head 17 of a Diesel type igniter G' which includes a filament 18. That is to say, one end of the internally threaded nipple 15 is swedged or otherwise fitted to the outer face of the section 2, and, when the threaded shank 16 of the Diesel igniter is passed through an opening in the outer casing wall and caused to engage with the internal threads of the nipple 15, the head 17 of the igniter will engage the outer face of the casing B and thus clamp the entire generator to the outer wall of the casing B and support it in position without further assistance.

As shown in Fig. 2 the section 2 of the generator, at the location of the Diesel igniter, is also provided with an inwardly extending thimble 19 which is swedged or otherwise fitted to the outer wall of the section 2. The cavity thus provided by the thimble 19 affords ample room for receiving the inner end of the filament 18 of the igniter and thus locates the entire filament directly within the enclosed and air tight chamber provided by the casing 2. As will presently appear, the purpose of the filament of the igniter is to supply heat to start preliminary gasification of incoming liquid fuel which is supplied to the generator through appropriate valved supply lines, now about to be described.

Preferably, the generator G is supplied with liquid fuel through a valve device H including a so-called idling or slow speed valve 20 and a high speed valve 21 which is synchronized through appropriate linkage with the air throttle control valve A3.

The valves 20 and 21 are in turn supplied with liquid fuel through the medium of an automatic fuel controlling valve 22 which is connected by a tube 23 with the intake manifold of the engine. The valve 22 is preferably spring biased to closed position, and, when the motor is turned over by the usual starter, the initial vacuum induced in the manifold will counteract the closing effort of the spring 22a and thus serve to admit liquid fuel to the valves 20 and 21 from the source of supply through the fuel intake pipe 24. The idling or slow speed valve 20 is normally manually set so as to admit a predetermined amount of fuel through pipe 20a into the casing 2 of the generator G when the automatic valve 22 is opened. On the other hand, after sufficient fuel has been supplied to the generator G through the valves 20 and 22, the high speed valve 21 which is connected by suitable linkage 25—25a with the air intake throttle A3 will serve to supply an increased quantity of fuel to the casing 2 of the generator through pipe 21a when the usual hand or foot throttle connection 25b of the engine is operated.

Assuming that the present invention, constructed and assembled in the manner heretofore set forth, is installed on an internal combustion engine, the operation will be as follows:

When it is desired to start the motor, a conventional switch (not shown) is closed manually to supply electric energy to the usual electric starter for turning the motor over, and, at the same time, electric current is supplied to the filament 18 of the Diesel igniter which heats up. As the motor continues to turn over under effort of the starter, and vacuum is intensified in the intake manifold A, A'—A', the automatic valve 22 opens against the pressure of spring 22a and admits raw liquid fuel from the usual storage tank through the pipe 24 to the inner passage 24a of the valve casing and thence to the idling or slow speed valve 20, which, as previously explained, is manually set to a predetermined open position. Liquid fuel will then flow through pipe 20a into the casing section 2 of the generator and also make its way to the section 1 through the lower connecting tubes 3. The heat furnished by the filament 18 of the Diesel igniter will gasify the preliminary fuel charge sufficiently in a short space of time so as to produce a dry, hot gas which rises and makes its way through the tubes 4–4 into the intermediate section or trap 5 of a generator from which it is aspirated into the air stream of the intake manifold through the hooded outlet ends 10 of the aspirating tubes 7. As soon as the gas aspirated from the tube 7 mixes with the incoming air in proper proportions to provide a combustible mixture, such mixture is supplied to the individual cylinders of the motor, and the usual spark plugs of the ignition system will ignite the combustible charge successively in the several cylinders and thus cause the motor to operate. Since the starter and the igniter are included in a common and conventional ignition circuit, battery energy which initially activated the starter and the igniter may be cut off and the heat of the exhaust gases flowing through the exhaust manifold B' will supply the necessary heat to continue to gasify raw liquid fuel supplied through either the manually set valve 20 or the manually operated throttle controlled valve 21 connected with the air intake throttle. As long as the motor operates, the vacuum in the intake manifold will maintain the automatic valve 22 open, and continued engine operation, according to varying speed and load demands, will be possible simply through manipulation of the hand or foot throttle, because dry gaseous fuel from the generator will be continuously supplied to the intake manifold A' through the aspirating tubes 7.

The gas generator G is entirely closed to the atmosphere except through the aspirating tubes 7, and, therefore, when the motor is in operation, the raw fuel supplied to the generator is converted into a dry hot oxygenless gas which must be withdrawn or aspirated from the generator through the tubes 7 covered or shielded by the hoods or caps 11. As the dry, hot gas escapes from the outer ends 10 of the tubes 7 under the vacuum inducted in the manifold, and with the aid of the bias-cut edge 10 and the hoods 11, the dry gas is mixed with air and thus energized or oxygenated to provide a combustible mixture which will adequately maintain continued operation of the motor until the usual ignition system is cut out of operation.

I claim:

1. A system for supplying gaseous fuel mixtures to internal combustion engines, comprising, an air intake manifold and an exhaust manifold, each having mating intermediate housing sections formed therewith, a generator for converting liquid fuel into gas supported in the exhaust manifold in the path of hot exhaust gases passing therethrough, aspirating tubes projecting through a wall of the intake manifold and having their inlet ends in communication with the gas generator and their outlet ends communicating with the intake manifold, means at the outlet ends of said aspirating tubes cooperating with the air stream of the intake manifold to induce a vacuum in the aspirating tubes and the generator when the engine is in operation, and a valve device for supplying liquid fuel to said generator.

2. A system for supplying gaseous fuel mixtures to internal combustion engines, comprising, an air intake manifold including a throttle valve and an exhaust manifold, said manifolds each having mating intermediate housing portions formed therewith, a generator for converting liquid fuel into gas supported in the exhaust manifold in the path of hot exhaust gases passing therethrough, aspirating tubes projecting through a wall of the intake manifold and having their inlet ends in communication with the gas generator and their outlet ends communicating with the intake manifold, means at the outlet ends of said aspirating tubes cooperating with the air stream of the intake manifold to induce a vacuum in the aspirating tubes and the generator when the engine is in operation, and a valve device for supplying liquid fuel to said generator, said valve device including low and high speed valves, means for synchronizing the high speed valve with the throttle valve of the air intake, and an automatic valve for controlling the supply of liquid fuel from a source of supply to said low and high speed valves, said automatic valve being normally closed when the engine is at rest and having a vacuum tube connection with the intake manifold whereby when the engine is in operation it will be opened and fuel will be supplied to the low and high speed valves.

3. A system for supplying gaseous fuel mixtures to internal combustion engines, comprising, an air intake manifold and an exhaust manifold, each having mating intermediate housing portions, means for securing said intake and exhaust manifolds together at the location of said intermediate housing portions, a generator for converting liquid fuel into gas supported in the exhaust manifold in the path of hot exhaust gases passing therethrough, said generator comprising a pair of spaced casings connected at their bottom portions by communicating tubes, an intermediate casing constituting the gas collecting chamber and having means at its top for communicating at its upper end with said first mentioned casings, an igniter arranged in one of said first mentioned casings, aspirating tubes having their inlet ends communicating with the said gas collecting chamber of the intermediate casing and having their outlet ends disposed in the intake manifold, means at the outlet ends of said aspirating tubes cooperating with the air stream of the intake manifold to induce a vacuum in said tubes and the enclosed space of the generator, and valve means for controlling the supply of liquid fuel to the gas generator.

4. A system for supplying gaseous fuel mixtures to internal combustion engines, comprising, an air intake manifold and an exhaust manifold, each having mating intermediate housing portions, means for securing said intake and exhaust manifolds together at the location of said intermediate housing portion, a generator for converting liquid fuel into gas supported in the exhaust manifold in the path of hot exhaust gases passing therethrough, an igniter arranged in the generator, aspirating tubes having their inlet ends communicating with the generator and having their outlet ends disposed in the intake manifold, means at the outlet ends of said aspirating tubes cooperating with the air stream of the intake manifold to induce a vacuum in said tubes and the enclosed space of the generator, said means comprising the ends of the aspirating tubes cut on the bias with their long sides facing counter to the path of flow of the air stream, and hoods supported over the outlet ends of said tubes for shielding the same against direct force of air drawn into the intake manifold by engine operation, and valve means for controlling the supply of liquid fuel to the gas generator.

5. A system for supplying gaseous fuel mixtures to internal combustion engines, comprising, an air intake manifold and an exhaust manifold, each having mating intermediate housing portions, means for securing said intake and exhaust manifolds together at the location of said intermediate housing portion, a generator for converting liquid fuel into gas, said generator comprising, a pair of casings spaced from each other and connected by communicating tubes, an intermediate casing constituting a gas collecting chamber arranged between said first mentioned casings and communicating with the latter by tubular elements, an internally threaded nipple having one end secured to a wall of one of the outer casings of the generator and in open communication with the gas generating space thereof, an igniter device including a filament projecting through said nipple into the casing and an externally threaded shank adapted to enter an opening in the wall of the housing to engage the internal threads of said nipple, said igniter also having an external head portion for engaging an outer face of the housing when the threaded shank thereof is fitted to the internally threaded nipple to support the generator in the exhaust manifold, aspirating tubes having their inlet ends disposed in the gas collecting chamber of the intermediate casing element of the generator and having their outlet ends disposed in the air stream of the intake manifold, means at the outlet ends of said aspirating tubes for inducing a vacuum therein and also in the enclosed space of the generator, and means for supplying liquid fuel to one of said casings of the generator.

6. A system for supplying a gaseous fuel mixture to internal combustion engines, comprising, an air intake manifold having a central air intake collar, a manually controlled throttle valve therein, an exhaust manifold arranged below the intake manifold, said intake and exhaust manifolds each having mating intermediate housing portions, means for securing said housing portions together, a generator for converting liquid fuel into gas supported in the housing section of the exhaust manifold in line with the hot exhaust gases passing therethrough, igniter means in the generator adapted to be energized to initiate gas formation on starting the engine, aspirating tubes having their inlet ends communicating with the gas generator and their outlet ends disposed in the intake manifold, said aspirating tubes being disposed substantially in the path of air intake leading from the throttle valve collar, and means at the outlet ends of said aspirating tubes for inducing a vacuum therein and in the enclosed space of the generator, said means including hoods overlying the outlet ends of the tubes to prevent air passing into the manifold through the throttle valve collar from directly entering the outlet ends of said tubes, and valve means for supplying liquid fuel to said generator.

JOSEPH E. FARRELL.